(12) United States Patent
Amine et al.

(10) Patent No.: US 8,551,661 B2
(45) Date of Patent: *Oct. 8, 2013

(54) LONG LIFE LITHIUM BATTERIES WITH STABILIZED ELECTRODES

(75) Inventors: Khalil Amine, Oakbrook, IL (US); Jaekook Kim, Naperville, IL (US); Donald R. Vissers, Naperville, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/116,559

(22) Filed: May 26, 2011

(65) Prior Publication Data

US 2011/0287326 A1  Nov. 24, 2011

Related U.S. Application Data

(63) Continuation of application No. 10/857,365, filed on May 28, 2004, now Pat. No. 7,968,235.

(60) Provisional application No. 60/488,063, filed on Jul. 17, 2003.

(51) Int. Cl.
  *H01M 6/18* (2006.01)
  *H01M 6/16* (2006.01)

(52) U.S. Cl.
  USPC ........... 429/322; 429/321; 429/324; 429/330; 429/337; 429/336

(58) Field of Classification Search
  USPC .......... 429/121, 322, 321, 324, 330, 337, 338
  See application file for complete search history.

(56) References Cited

U.S. PATENT DOCUMENTS

| | | |
|---|---|---|
| 4,513,143 A | 4/1985 | Ng et al. |
| 4,857,423 A | 8/1989 | Abraham et al. |
| 5,487,959 A | 1/1996 | Koksbang |
| 5,709,968 A | 1/1998 | Shimizu |
| 5,731,106 A | 3/1998 | Tsutsumi et al. |
| 5,763,119 A | 6/1998 | Adachi |
| 5,824,434 A | 10/1998 | Kawakami et al. |
| 5,849,432 A | 12/1998 | Angell et al. |
| 5,858,573 A | 1/1999 | Abraham et al. |
| 6,004,698 A | 12/1999 | Richardson et al. |
| 6,045,952 A | 4/2000 | Kerr et al. |
| 6,074,777 A | 6/2000 | Reimers et al. |

(Continued)

FOREIGN PATENT DOCUMENTS

JP  75000095  1/1975

OTHER PUBLICATIONS

Final Office Action for U.S. Appl. No. 10/857,365, dated Aug. 28, 2009.

(Continued)

*Primary Examiner* — Helen O Conley
(74) *Attorney, Agent, or Firm* — Foley & Lardner LLP

(57) ABSTRACT

The present invention relates to non-aqueous electrolytes having stabilization additives and electrochemical devices containing the same. Thus the present invention provides electrolytes containing an alkali metal salt, a polar aprotic solvent, a first additive that is a substituted or unsubstituted organoamine, substituted or unsubstituted alkane, substituted or unsubstituted alkene, or substituted or unsubstituted aryl compound, and/or a second additive that is a metal (chelato) borate. When used in electrochemical devices with, e.g., lithium manganese oxide spinel electrodes, the new electrolytes provide batteries with improved calendar and cycle life.

16 Claims, 4 Drawing Sheets

(56) References Cited

U.S. PATENT DOCUMENTS

| | | | |
|---|---|---|---|
| 6,207,326 B1 | 3/2001 | Kawakami et al. |
| 6,232,021 B1 | 5/2001 | Negoro |
| 6,291,107 B1 | 9/2001 | Shimizu |
| 6,387,571 B1 | 5/2002 | Lain et al. |
| 6,395,423 B1 | 5/2002 | Kawakami et al. |
| 6,506,516 B1 | 1/2003 | Wietelmann et al. |
| 6,780,545 B2 | 8/2004 | Birke-Salam et al. |
| 6,787,268 B2 | 9/2004 | Koike et al. |
| 6,841,303 B2 | 1/2005 | Park et al. |
| 7,097,944 B2 | 8/2006 | Murai et al. |
| 7,172,834 B1 | 2/2007 | Jow et al. |
| 7,588,859 B1 | 9/2009 | Oh et al. |
| 7,968,235 B2 | 6/2011 | Amine et al. |
| 2001/0033964 A1 | 10/2001 | Heider et al. |
| 2002/0039687 A1 | 4/2002 | Barker et al. |
| 2003/0091892 A1 | 5/2003 | Watanabe et al. |
| 2003/0118912 A1 | 6/2003 | Watanabe et al. |
| 2003/0190529 A1 | 10/2003 | Kim et al. |
| 2004/0013944 A1 | 1/2004 | Lee et al. |
| 2004/0028996 A1 | 2/2004 | Hamamoto et al. |
| 2004/0029017 A1 | 2/2004 | Besenhard et al. |
| 2004/0121239 A1 | 6/2004 | Abe et al. |
| 2004/0131934 A1 | 7/2004 | Sugnaux et al. |
| 2004/0151951 A1 | 8/2004 | Hyung et al. |
| 2004/0157126 A1 | 8/2004 | Belharouak et al. |
| 2004/0191633 A1 | 9/2004 | Johnson et al. |
| 2004/0214091 A1 | 10/2004 | Lim et al. |
| 2005/0106470 A1 | 5/2005 | Yoon et al. |
| 2005/0227143 A1 | 10/2005 | Amine et al. |
| 2006/0147809 A1 | 7/2006 | Amine et al. |
| 2006/0210883 A1 | 9/2006 | Chen et al. |

OTHER PUBLICATIONS

Final Office Action for U.S. Appl. No. 11/338,902, dated Mar. 23, 2010.

International Search Report for PCT Application No. PCT/US06/08664, dated Dec. 13, 2006.

Non-Final Office Action for U.S. Appl. No. 10/857,365, dated Jan. 29, 2010.

Non-Final Office Action for U.S. Appl. No. 10/857,365, dated Sep. 29, 2010.

Non-Final Office Action for U.S. Appl. No. 10/857,365, dated Apr. 30, 2008.

Non-Final Office Action for U.S. Appl. No. 11/338,902, dated Sep. 30, 2009.

Notice of Allowance for U.S. Appl. No. 10/857,365, dated Feb. 23, 2011.

Amatucci, G. G. et al., "Failure Mechanism and Improvement of the Elevated Temperature Cycling of $LiMn_2O_4$ Compounds Through the Use of the $LiAl_xMn_{2-x}O_{4-z}F_z$ Solid Solution," *J. Electrochem. Soc.*, vol. 148, No. 2, pp. A171-A182, 2001; published by The Electrochemical Society, Inc.

Andersson, A. S. et al., "Lithium extraction/insertion in $LiFePO_4$: an X-ray diffraction and Mössbauer spectroscopy study," *Solid State Ionics*, vol. 130, pp. 41-52, Apr. 28, 2000; published by Elsevier Science B.V.

Blyr, A. et al., "Self-Discharge of $LiMn_2O_4$/C Li-Ion Cells in Their Discharged State," vol. 145, No. 1, pp. 194-209, Jan. 1998; published by The Electrochemical Society, Inc.

Chen, J. et al., "Chemical Overcharge and Overdischarge Protection for Lithium-Ion Batteries," *Electrochemical and Solid-State Letters*, vol. 8, No. 1, pp. A59-A62, 2005; published by The Electrochemical Society, Inc.

Chen, Z. et al., "Reducing Carbon in $LiFePO_4$/C Composite Electrodes to Maximize Specific Energy, Volumetric Energy, and Tap Density," *J. Electrochem. Soc.*, vol. 149, No. 9, pp. A1184-A1189, 2002; published by The Electrochemical Society, Inc. Available electronically Jul. 29, 2002.

Chung, S.-Y. et al., "Electronically conductive phospho-olivines as lithium storage electrodes," *Nature Materials*, vol. 1, pp. 123-128, Oct. 2002; published by Nature Publishing Group. Published online Sep. 22, 2002.

Davidson, I. J. et al., "Rechargeable cathodes based on $Li_2CR_xMn_{2-x}O_4$," *Journal of Power Sources*, vol. 54, pp. 205-208, 1995; published by Elsevier Science B.V.

Franger, S. et al., "Optimized Lithium Iron Phosphate for High-Rate Electrochemical Applications," *J. Electrochem. Soc.*, vol. 151, vol. 7, pp. A1024-A1027, 2004; published by The Electrochemical Society, Inc. Available electronically May 27, 2004.

Huang, H. et al., "Approaching Theoretical Capacity of $LiFePO_4$ at Room Temperature at High Rates," *Electrochemical and Solid-State Letters*, vol. 4, No. 10, pp. A170-A172, 2001; published by The Electrochemical Society, Inc. Available electronically Aug. 20, 2001.

Kannan, A. M. et al., "Surface/Chemically Modified $LiMn_2O_4$ Cathodes for Lithium-Ion Batteries," *Electrochemical and Solid-State Letters*, vol. 5, No. 7, pp. A167-A169, 2002; published by The Electrochemical Society, Inc. Available electronically May 3, 2002.

Kellomäki, M. et al., "Processing and properties of two different poly (ortho esters)," *Journal of Materials Science; Materials in Medicine*, vol. 11, pp. 345-355, 2000; published by Kluwer Academic Publishers.

Komaba, S. et al., "2-Vinylpyridine as Film-forming Additve [sic] to Suppress the Degradation of Carbon Anode by Dissolved Manganese for $E/LiMn_2O_4$ Rechargable Battery," Chemistry Letters, 2002, No. 12, pp. 1236-1237; published by The Chemical Society of Japan.

Lee, H. S. et al., "Synthesis of a Series of Fluorinated Boronate Compounds and Their Use as Additives in Lithium Battery Electrolytes," *J. Electrochem. Soc.*, vol. 151, No. 9, pp. A1429-A1435, 2004; published by The Electrochemical Society, Inc.

Padhi, A. K. et al., "Phospho-olivines as Positive-Electrode Materials for Rechargeable Lithium Batteries," *J. Electrochem. Soc.*, vol. 144, No. 4, Apr. 1997; published by The Electrochemical Society, Inc.

Ravet, N. et al., "Electroactivity of natural and synthetic triphylite," *Journal of Power Sources*, vols. 97-98, pp. 503-507, Jul. 3, 2001; published by Elsevier Science B.V.

Sigala, C. et al., "Influence of the Cr Content on the Electrochemical Behavior of the $LiCr_yMn_{2-y}O_4$ ($0 \le y \le 1$) Compounds," *J. Electrochem. Soc.*, vol. 148, No. 8, pp. A826-A832, 2001; published by The Electrochemical Society, Inc. Available electronically Jun. 25, 2001.

Xu, K. et al., "Lithium Bis(oxalate)borate Stabilizes Graphite Anode in Propylene Carbonate," *Electrochemical and Solid-State Letters*, vol. 5, No. 11, pp. A259-A262, 2002; published by The Electrochemical Society, Inc. Available electronically Sep. 10, 2002.

Xu, W. et al., "Weakly Coordinating Anions, and the Exceptional Conductivity of their Nonaqueous Solutions," *Electrochemical and Solid-State Letters*, 2001, vol. 4, No. 1, pp. E1-E4, The Electrochemical Society, Inc.

Yamada, A. et al., "Optimized $LiFePO_4$ for Lithium Battery Cathodes," *J. Electrochem. Soc.*, vol. 148, No. 3, pp. A224-A229, 2001; published by The Electrochemical Society, Inc.

Yoshio, M. et al., "Storage and cycling performance of Cr-modified spinel at elevated temperatures," Journal of Power Sources, vol. 101, pp. 79-85, Aug. 29, 2001; published by Elsevier Science B.V.

LONG LIFE LITHIUM BATTERIES WITH STABILIZED ELECTRODES

CROSS-REFERENCE TO RELATED APPLICATIONS

This application is a continuation of U.S. patent application Ser. No. 10/857,365, filed May 28, 2004, which claims the benefit of U.S. Provisional Application No. 60/488,063 filed Jul. 17, 2003, the entire disclosures of which are incorporated herein by reference for any and all purposes.

FIELD OF THE INVENTION

This invention relates to non-aqueous electrolytes comprising stabilization additives and electrochemical devices containing the same. In particular the invention relates to long life lithium batteries.

BACKGROUND

Lithium-ion batteries utilize carbon anodes, lithiated transition metal oxide cathodes, and an organic-based solvent electrolyte with a dissolved conducting salt such as lithium hexafluorophosphate ($LiPF_6$). These batteries currently dominate the battery market in the area of cellular phones, cam-recorders, computers, and other electronic equipment. However, attempts to apply these battery technologies to electric and hybrid vehicles have met with limited success. Problematic areas include safety, calendar life, cost, and, in the case of hybrid vehicles, high rate capability for power assist and regenerative braking.

Lithium-manganese-oxide-spinel-based electrodes have drawn enormous attention as a cathode material, since the Mn is less expensive compared to the Co and Ni that are currently being used in the commercial Li-ion cells. Mn also has far better power, is safer and is environmentally benign. However, the poor capacity retention (fading) of $LiMn_2O_4$ spinel has been a major drawback of this technology and has prevented its wide acceptance by manufacturers for commercialization. Moreover, the deterioration of its electrochemical performance, including capacity loss, impedance rise, and material instability, is far more severe at higher temperatures, above 40-50° C., that can easily be reached in portable electronic devices or hybrid electric vehicles. Although several factors have been reported to be responsible for the electrochemical degradation of the spinel based cells, it is generally attributed to the instability of manganese spinel. This degradation likely results from the formation and dissolution of manganese ions in the organic based electrolyte.

The dissolution of the manganese originates from the instability of the manganese (III) ions on the surface of the manganese spinel electrode during cycling in the $LiPF_6$ based organic electrolyte that is used in nearly all commercial Li-ion batteries today. The manganese (III) instability results from the disproportionation reaction that occurs on the surface of the spinel electrode ($2Mn^{3+}_{(stable\ solid)} \rightarrow Mn^{4+}_{(stable\ solid)} + Mn^{2+}_{(unstable\ solid,\ tending\ to\ be\ dissolved)}$). The $Mn^{2+}$ ions that are formed dissolve in the $LiPF_6$-containing organic electrolyte. Thereafter, the dissolved manganese ions diffuse through the electrolyte to the graphite anode where they are likely reduced to manganese metal and deposited on the anode surface. This phenomenon results in a huge increase in the impedance of the anode and a loss of active lithium from the cell, as well as the degradation of the spinel cathode. The result is a cell with poor electrochemical performance and little or no power.

In addition, manganese dissolution has been attributed to acid attack, and occurs even with trace levels of HF, commonly present in $LiPF_6$-based electrolytes. Together with the manganese ion diffusion problem as mentioned above, the presence of acid such as HF causes formation of a partially protonated $\lambda$-$MnO_2$ phase. This phase is not totally electrochemically active, since the protons are bonded to octahedral oxygen sites of the cubic close-packed oxygen array of $MnO_6$. This scenario suggests that with the manganese dissolution there is also the partial protonation of the $\lambda$-$MnO_2$ that leads to the deterioration of manganese spinel cathode material.

To prevent degradation of the cathode material, several approaches have been attempted, including cationic substitution of manganese or surface modification (coatings) of the spinel cathode or of graphite anode surfaces. See, e.g., C. Sigala, A. et al., *J. Electrochem. Soc.*, 148, A826 (2001); I. J. Davidson, et al., *J. Power Sources*, 54, 205 (1995); M. Yoshio, et al., *J. Power Sources*, 101, 79 (2001); and A. M. Kannan and A. Manthiram, *Electrochem. Solid State Lett.*, 5, A167 (2002). While these methods have shown some promise at room temperature, none have prevented significant electrochemical deterioration due to the manganese dissolution at elevated temperatures. See, e.g., A. Blyr, et al., *J. Electrochem. Soc.*, 145, 194 (1998); and G. G. Amatucci, et al., *J. Electrochem. Soc.*, 148, A171 (2001). Accordingly, there is a need in the art to develop electrolyte systems that protect the cathode surface from any unwanted reactions. Furthermore, there is a need in the art for batteries using such electrolyte systems.

SUMMARY

In one aspect, the invention provides non-aqueous electrolyte solutions containing one or more chemical stabilizers for use in electrochemical devices. In another aspect, the invention further provides battery cells using the stabilization additives and having excellent specific power and energy as well as extended calendar and cycle life across a broad temperature range with little or no power or capacity loss. The non-aqueous electrolytes of the present invention containing such stabilization additives are effective in enhancing the performance of not only spinel-based lithium ion batteries, but also that of lithium cobalt oxide and lithium nickel-cobalt-oxide lithium ion cells and the like.

Thus the present invention provides a non-aqueous electrolyte comprising: an alkali metal salt; a polar aprotic solvent; a first additive that can be a substituted or unsubstituted organoamine, substituted or unsubstituted alkane, substituted or unsubstituted alkene, substituted or unsubstituted aryl compound, or a mixture of any two or more thereof; and a second additive that is a metal (chelato)borate. In some embodiments the first additive is a substituted or unsubstituted organoamine, substituted or unsubstituted alkene, substituted or unsubstituted aryl compound, or a mixture of any two or more thereof. Suitable first additives for use in the non-aqueous electrolyte include pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o-terphenyl, N-methylpyrrole, naphthalene, or a mixture of any two or more thereof. Typically, the first additive is vinyl pyridine, such as 2- or 4-vinyl pyridine, N-methylpyrrole, triethanolamine, or biphenyl. The second additive can be a metal mono or bis (chelato)borate. For example, suitable second additives include lithium mono or bis(chelato)borates such as $Li(C_2O_4)BF_2$ or $Li[(C_2O_4)_2B]$ (LiBOB) (previously described in W. Xu, C. A. Angell, Electrochem. Solid-State Lett. 4 (2001) El; and Xu. S. Zhang, T. R. Jow, W. Xu, C. A. Angell, Electroch. Solid-State Lett. 5 (2002) A26). In some embodiments, the first additive is N-methylpyrrole, 2-vinyl pyridine, 4-vinyl pyridine, triethanolamine, or biphenyl, and the second additive is a lithium (chelato)borate such as $Li[(C_2O_4)_2B]$ or $Li(C_2O_4)BF_2$.

The non-aqueous electrolyte of the present invention includes a polar aprotic solvent such as ethylene carbonate, propylene carbonate, dimethyl carbonate, diethyl carbonate, ethyl methyl carbonate, dimethyl ether, gamma butyrolactone, or a mixture of any two or more thereof. The non-aqueous electrolyte also includes an alkali metal salt, such as a lithium salt, dissolved in the polar aprotic solvent. Thus $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, or a mixture of any two or more thereof is typically present in a concentration of from about 0.5 to about 2 molar.

The invention further provides a non-aqueous electrolyte comprising: an alkali metal salt; a polar aprotic solvent; and a first additive that is a substituted or unsubstituted unsaturated organoamine, i.e., an organoamine bearing an alkene group Typically the first additive is selected from vinyl pyridazine, vinyl quinoline, vinyl pyridine, vinyl indole, vinyl imidazole, vinyl piperidine, vinyl pyrimidine, vinyl pyrazine, vinyl isoquinoline, vinyl quinoxaline. In some embodiments where the first additive is an unsaturated organoamine, the first additive is vinyl pyridine, such as 2-vinyl pyridine or 4-vinyl pyridine. In other such embodiments, the non-aqueous electrolyte further comprises a second additive such as $Li[(C_2O_4)_2 B]$ or $Li(C_2O_4)BF_2$. The alkali metal salts and polar aprotic solvents of the present embodiment are as described herein.

In yet another embodiment, there is provided a non-aqueous electrolyte which includes an alkali metal salt other than $Li[(C_2O_4)_2B]$; a polar aprotic solvent; and a metal (chelato) borate additive, such as $Li[(C_2O_4)_2B]$ or $Li(C_2O_4)BF_2$. Additional additives may be included in the electrolyte as described herein. The alkali metal salt and polar aprotic solvent of the present embodiments are also as described herein.

In the non-aqueous electrolytes of the present invention, the first additive and the second additive are present independently in an amount from about 0.0005 to about 30 weight percent (wt %). Typically, the first additive is present in an amount of about 0.01 to about 10 wt %, and more typically, from about 0.01 to about 2 wt %. Where the second additive is absent and the first additive is a substituted or unsubstituted unsaturated organoamine, the first additive is typically present in an amount of about 0.0005 to about 30 wt %, and more typically is present at about 0.001 to about 2 wt %. The second additive is typically present in an amount of about 0.0005 to about 10 wt %, about 0.0005 to about 2 wt %, and more typically, about 0.001 to about 2 wt %. Where the second additive is present alone, it can also be present in an amount of about 0.0005 to about 30 wt % and other amounts as described herein.

There are further provided methods of making the non-aqueous electrolytes of the present invention. For example, in one embodiment, the method includes combining an alkali metal salt; a polar aprotic solvent; a first additive that is a substituted or unsubstituted organoamine, a substituted or unsubstituted alkene, or a substituted or unsubstituted aryl compound; and a second additive that is a metal (chelato) borate. In another embodiment, the method includes combining an alkali metal salt; a polar aprotic solvent; and a first additive that is a substituted or unsubstituted unsaturated organoamine. In still another embodiment, the method includes combining an alkali metal salt other than $Li[(C_2O_4)_2 B]$; a polar aprotic solvent; and an additive that is a metal (chelato)borate.

In another aspect, the invention provides an electrochemical device comprising: a cathode; an anode; and a non-aqueous electrolyte as described herein. In one embodiment the electrochemical device is a lithium secondary battery; the cathode is a lithium metal oxide cathode; the anode is a carbon or lithium metal anode; and the anode and cathode are separated from each other by a porous separator. Typically, the cathode in such a cell comprises $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMet_{0.5}Mn_{1.5}O_4$, vanadium oxide, or mixtures of any two or more thereof, wherein Met is Al, Mg, Ti, B, Ga, Si, Ni, or Co, and wherein $0<x<0.3$, $0<z<0.5$, $0<y<0.5$. In certain embodiments, the cathode comprises a spinel manganese oxide with a formula of $Li_{1+x}Mn_{2-z}Met_yO_{4-m}X_n$, wherein Met is Al, Mg, Ti, B, Ga, Si, Ni, or Co, and X is S or F, and wherein $0<x<0.3$, $0<z<0.5$, $0<y<0.5$, $0<m<0.5$ and $0<n<0.5$. In such devices the anode may comprise graphite, carbon, $Li_4Ti_5O_{12}$, tin alloys, silica alloys, intermetallic compounds, lithium metal, or mixtures of any two or more thereof.

DETAILED DESCRIPTION

Figure 1:
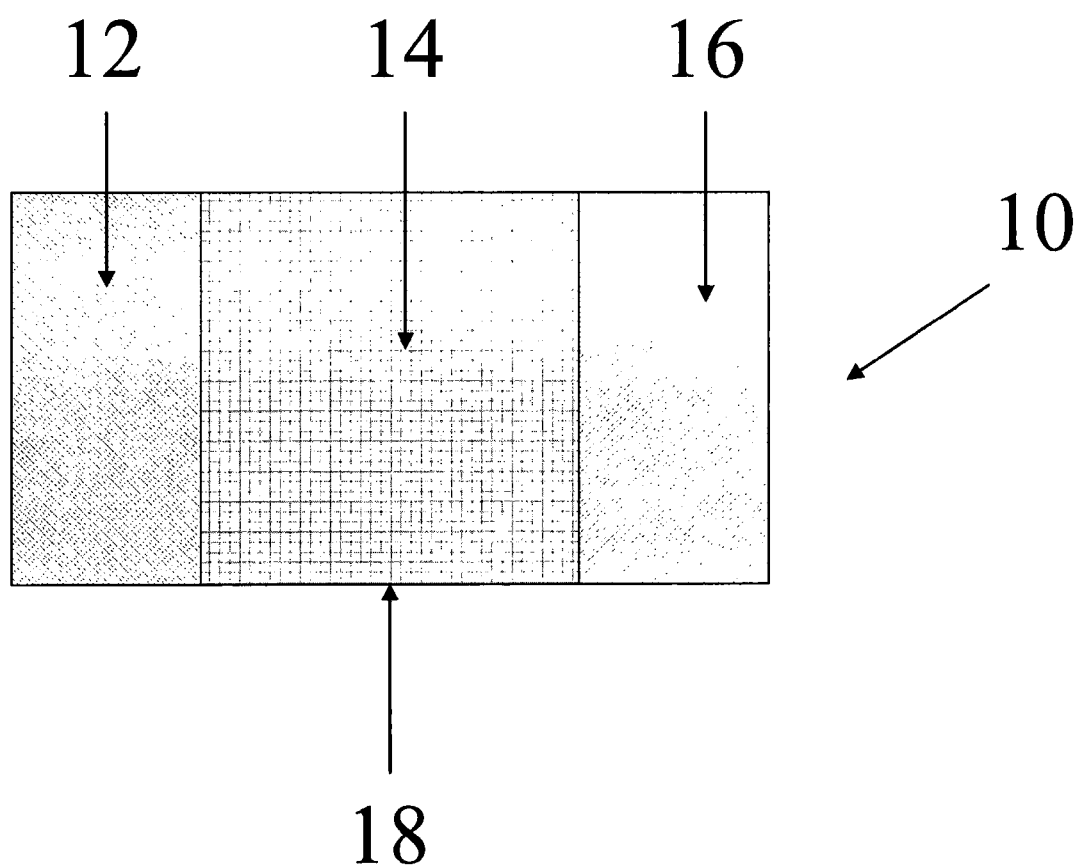
FIG. 1 depicts a schematic representation of an electrochemical cell as described in Example 1.

The following terms are used throughout as defined below.

The term "organoamine" refers to a hydrocarbon substituted by at least one nitrogen and can be substituted with other substituents or remain otherwise unsubstituted. Thus, organoamine includes but is not limited to alkylamine, dialkylamine, trialkylamine, arylamine, diarylamine, triarylamine, aralkylamine, HN(alkyl)(aryl), heterocyclylamine, diheterocyclylamine, triheterocyclylamine, $N(alkyl)_2(aryl)$, $N(aryl)_2(alkyl)$, $N(alkyl)_2(heterocyclyl)$, $N(aryl)_2(heterocyclyl)$, $H_2N$(heterocyclylalkyl) and so forth. The term "organoamine" also refers to substituted or unsubstituted nitrogen-containing heterocycles such as pyridine, pyrazine, pyridazine, piperidine, pyrimidine, imidazole, indole, quinoline, and the like. Unsubstituted organoamines have no non-hydrogen and non-carbon substituents other than nitrogen. Substituted organoamines have the same relationship to unsubstituted organoamines as substituted alkyl groups or substituted heterocyclyl groups have to unsubstituted alkyl groups and unsubstituted heterocyclyl groups respectively as defined below. Thus, for example, triethanolamine and vinyl indole are both substituted organoamines.

The phrase "unsaturated organoamine" refers to organoamines that include a carbon-carbon double bond that is not part of an aromatic ring. Thus vinyl pyridine is an unsaturated organoamine, but pyridine is not. Unsaturated organoamines are a subset of substituted organoamines but may also be further substituted in the manner of substituted alkyl or heterocyclyl groups.

The phrase "unsubstituted alkyl" refers to alkyl groups that do not contain heteroatoms. Thus the phrase includes straight chain alkyl groups such as methyl, ethyl, propyl, butyl, pentyl, hexyl, heptyl, octyl, nonyl, decyl, undecyl, dodecyl and the like. The phrase also includes branched chain isomers of straight chain alkyl groups, including but not limited to, the following which are provided by way of example: $-CH(CH_3)_2$, $-CH(CH_3)(CH_2CH_3)$, $-CH(CH_2CH_3)_2$, $-C(CH_3)_3$, $-C(CH_2CH_3)_3$, $-CH_2CH(CH_3)_2$, $-CH_2CH(CH_3)(CH_2CH_3)$, $-CH_2CH(CH_2CH_3)_2$, $-CH_2C(CH_3)_3$, $-CH_2C(CH_2CH_3)_3$, $-CH(CH_3)CH(CH_3)(CH_2CH_3)$, $-CH_2CH_2CH(CH_3)_2$, $-CH_2CH_2CH(CH_2CH_3)$, $-CH_2CH_2CH(CH_2CH_3)_2$, $-CH_2CH_2C(CH_3)_3$, $-CH_2CH_2C(CH_2CH_3)_3$, $-CH(CH_3)CH_2CH(CH_3)_2$, $-CH(CH_3)CH(CH_3)CH(CH_3)_2$, $-CH(CH_2CH_3)CH(CH_3)CH(CH_3)(CH_2CH_3)$, and others. The phrase also includes cyclic alkyl groups such as cyclopropyl, cyclobutyl, cyclopentyl, cyclohexyl, cycloheptyl, and cyclooctyl and such rings substituted with straight and branched chain alkyl groups as defined above. The phrase also includes polycyclic alkyl groups such as, but not limited to, adamantyl, norbornyl, and bicyclo[2.2.2]octyl and such rings substituted with straight and branched chain alkyl groups as defined above. Thus, the phrase unsubstituted alkyl groups includes primary alkyl groups, secondary alkyl groups, and tertiary alkyl groups. Unsubstituted alkyl groups may be bonded to one or more carbon atom(s), oxygen atom(s), nitrogen atom(s), and/or sulfur atom(s) in the parent compound. Typically, unsubstituted alkyl groups include straight and branched chain alkyl groups and cyclic alkyl groups having 1 to 20 carbon atoms and can have from 1 to 10 carbon atoms. Even more typically, such groups, also known as unsubstituted lower alkyl groups, have from 1 to 5 carbon atoms. Other embodiments of unsubstituted alkyl groups include straight and branched chain alkyl groups having from 1 to 3 carbon atoms and include methyl, ethyl, propyl, and $-CH(CH_3)_2$. An unsubstituted alkyl group in which the open valence is filled by hydrogen is an unsubstituted alkane. Thus, unsubstituted alkanes include but are not limited to isobutane, pentane, hexane, octane, isooctane, and others.

The phrase "substituted alkyl" refers to an unsubstituted alkyl group as defined above in which one or more bonds to a carbon(s) or hydrogen(s) are replaced by a bond to non-hydrogen and non-carbon atoms such as, but not limited to, a halogen atom in halides such as F, Cl, Br, and I; an oxygen atom in groups such as hydroxyl groups, alkoxy groups, aryloxy groups, and ester groups; a sulfur atom in groups such as thiol groups, alkyl and aryl sulfide groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as in trialkylsilyl groups, dialkylarylsilyl groups, alkyldiarylsilyl groups, and triarylsilyl groups; and other heteroatoms in various other groups. Substituted alkyl groups also include groups in which one or more bonds to a carbon(s) or hydrogen(s) atom is replaced by a bond to a heteroatom such as oxygen in carbonyl, carboxyl, and ester groups; nitrogen in groups such as imines, oximes, hydrazones, and nitriles. Typically, substituted alkyl groups include, among others, alkyl groups in which one or more bonds to a carbon or hydrogen atom is/are replaced by one or more bonds to fluorine atoms. One example of a substituted alkyl group is the trifluoromethyl group and other alkyl groups that contain the trifluoromethyl group. Other alkyl groups include those in which one or more bonds to a carbon or hydrogen atom is replaced by a bond to an oxygen atom such that the substituted alkyl group contains a hydroxyl, alkoxy, aryloxy group, or heterocyclyloxy group. Still other alkyl groups include alkyl groups that have an amine, alkylamine, dialkylamine, arylamine, (alkyl)(aryl)amine, diarylamine, heterocyclylamine, (alkyl)(heterocyclyl)amine, (aryl)(heterocyclyl) amine, or diheterocyclylamine group. A substituted alkyl group in which the open valence is filled by hydrogen is a substituted alkane. Thus, substituted alkanes include but are not limited to ethanol, ethylamine, propylamine and others.

The phrase "unsubstituted aryl" refers to aryl groups that do not contain heteroatoms. Thus the phrase includes, but is not limited to, groups such as phenyl, biphenyl, anthracenyl, naphthenyl by way of example. Although the phrase "unsubstituted aryl" includes groups containing condensed rings such as naphthalene, it does not include aryl groups that have other groups such as alkyl or halo groups bonded to one of the ring members, as aryl groups such as tolyl are considered herein to be substituted aryl groups as described below. For example, a typical unsubstituted aryl group is phenyl. Unsubstituted aryl groups may be bonded to one or more carbon atom(s), oxygen atom(s), nitrogen atom(s), and/or sulfur atom(s) in the parent compound, however. An unsubstituted aryl group in which the open valence is filled by hydrogen is an unsubstituted aryl compound. Thus, unsubstituted aryl compounds include but are not limited to benzene, biphenyl, o-terphenyl, naphthalene and the like.

The phrase "substituted aryl" has the same meaning with respect to unsubstituted aryl groups that substituted alkyl groups had with respect to unsubstituted alkyl groups. However, a substituted aryl group also includes aryl groups in which one of the aromatic carbons is bonded to one of the non-carbon or non-hydrogen atoms described above and also includes aryl groups in which one or more aromatic carbons of the aryl group is bonded to a substituted and/or unsubstituted alkyl, alkenyl, or alkynyl group as defined herein. This includes bonding arrangements in which two carbon atoms of an aryl group are bonded to two atoms of an alkyl, alkenyl, or alkynyl group to define a fused ring system (e.g. dihydronaphthyl or tetrahydronaphthyl). Thus, the phrase "substituted aryl" includes, but is not limited to tolyl, and hydroxyphenyl among others. A substituted aryl group in which the open valence is filled by hydrogen is a substituted aryl compound. Thus, substituted aryl compounds include but are not limited to toluene, 1,2 diphenyl ether, vinyl biphenyl, and the like.

The phrase "unsubstituted alkenyl" refers to straight and branched chain and cyclic groups such as those described with respect to unsubstituted alkyl groups as defined above, except that at least one double bond exists between two carbon atoms. Examples include, but are not limited to, vinyl, $-CH=CH(CH_3)$, $-CH=C(CH_3)_2$, $-C(CH_3)=CH_2$, $-C(CH_3)=CH(CH_3)$, $-C(CH_2CH_3)=CH_2$, cyclohexenyl, cyclopentenyl, cyclohexadienyl, butadienyl, pentadienyl, and hexadienyl among others. An unsubstituted alkenyl group in which the open valence is filled by hydrogen is an unsubstituted alkene. Thus, unsubstituted alkenes include but are not limited to ethylene, 1-propene, butadiene, 1,3-dimethyl butadiene, and the like.

The phrase "substituted alkenyl" has the same meaning with respect to unsubstituted alkenyl groups that substituted alkyl groups had with respect to unsubstituted alkyl groups. A substituted alkenyl group includes alkenyl groups in which a non-carbon or non-hydrogen atom is bonded to a carbon double bonded to another carbon and those in which one of the non-carbon or non-hydrogen atoms is bonded to a carbon not involved in a double bond to another carbon. Typical unsubstituted alkenyl groups have from 2 to 20 carbons, and can have from 2 to 10 carbons. Similarly, substituted alkenes are substituted alkenyl groups in which the open valence is filled with hydrogen. Thus, substituted alkenes include but are not limited to vinyl carbonate, and vinyl ethylene carbonate, among others.

The phrase "unsubstituted alkynyl" refers to straight and branched chain groups such as those described with respect to unsubstituted alkyl groups as defined above, except that at least one triple bond exists between two carbon atoms. Examples include, but are not limited to —C≡CH, —C≡C (CH$_3$), —C≡C(CH$_2$CH$_3$), —CH$_2$C≡CH, —CH$_2$C≡C (CH$_3$), and —CH$_2$C≡C(CH$_2$CH$_3$) among others. Typical unsubstituted alkynyl groups have form 2 to 20 carbons, and can have from 2 to 10 carbons.

The phrase "substituted alkynyl" has the same meaning with respect to unsubstituted alkynyl groups that substituted alkyl groups had with respect to unsubstituted alkyl groups. A substituted alkynyl group includes alkynyl groups in which a non-carbon or non-hydrogen atom is bonded to a carbon triple bonded to another carbon and those in which a non-carbon or non-hydrogen atom is bonded to a carbon not involved in a triple bond to another carbon.

The phrase "unsubstituted aralkyl" refers to unsubstituted alkyl groups as defined above in which a hydrogen or carbon bond of the unsubstituted alkyl group is replaced with a bond to an aryl group as defined above. For example, methyl (—CH$_3$) is an unsubstituted alkyl group. If a hydrogen atom of the methyl group is replaced by a bond to a phenyl group, such as if the carbon of the methyl were bonded to a carbon of benzene, then the compound is an unsubstituted aralkyl group (i.e., a benzyl group). Thus the phrase includes, but is not limited to, groups such as benzyl, diphenylmethyl, and 1-phenylethyl (—CH(C$_6$H$_5$)(CH$_3$)) among others.

The phrase "substituted aralkyl" has the same meaning with respect to unsubstituted aralkyl groups that substituted aryl groups had with respect to unsubstituted aryl groups. However, a substituted aralkyl group also includes groups in which a carbon or hydrogen bond of the alkyl part of the group is replaced by a bond to a non-carbon or a non-hydrogen atom. Examples of substituted aralkyl groups include, but are not limited to, —CH$_2$C(=O)(C$_6$H$_5$), and —CH$_2$(2-methylphenyl) among others.

The phrase "unsubstituted heterocyclyl" refers to both aromatic and nonaromatic ring compounds including monocyclic, bicyclic, and polycyclic ring compounds such as, but not limited to, quinuclidyl, containing 3 or more ring members of which one or more is a heteroatom such as, but not limited to, N, O, and S. Although the phrase "unsubstituted heterocyclyl" includes condensed heterocyclic rings such as benzimidazolyl, it does not include heterocyclyl groups that have other groups such as alkyl or halo groups bonded to one of the ring members as compounds such as 2-methylbenzimidazolyl are substituted heterocyclyl groups. Examples of heterocyclyl groups include, but are not limited to: unsaturated 3 to 8 membered rings containing 1 to 4 nitrogen atoms such as, but not limited to pyrrolyl, pyrrolinyl, imidazolyl, pyrazolyl, pyridinyl, dihydropyridinyl, pyrimidinyl, pyrazinyl, pyridazinyl, triazolyl (e.g. 4H-1,2,4-triazolyl, 1H-1,2,3-triazolyl, 2H-1,2,3-triazolyl etc.), tetrazolyl, (e.g. 1H-tetrazolyl, 2H tetrazolyl, etc.); saturated 3 to 8 membered rings containing 1 to 4 nitrogen atoms such as, but not limited to, pyrrolidinyl, imidazolidinyl, piperidinyl, piperazinyl; condensed unsaturated heterocyclic groups containing 1 to 4 nitrogen atoms such as, but not limited to, indolyl, isoindolyl, indolinyl, indolizinyl, benzimidazolyl, quinolyl, isoquinolyl, indazolyl, benzotriazolyl; unsaturated 3 to 8 membered rings containing 1 to 2 oxygen atoms and 1 to 3 nitrogen atoms such as, but not limited to, oxazolyl, isoxazolyl, oxadiazolyl (e.g. 1,2,4-oxadiazolyl, 1,3,4-oxadiazolyl, 1,2,5-oxadiazolyl, etc.); saturated 3 to 8 membered rings containing 1 to 2 oxygen atoms and 1 to 3 nitrogen atoms such as, but not limited to, morpholinyl; unsaturated condensed heterocyclic groups containing 1 to 2 oxygen atoms and 1 to 3 nitrogen atoms, for example, benzoxazolyl, benzoxadiazolyl, benzoxazinyl (e.g. 2H-1,4-benzoxazinyl etc.); unsaturated 3 to 8 membered rings containing 1 to 3 sulfur atoms and 1 to 3 nitrogen atoms such as, but not limited to, thiazolyl, isothiazolyl, thiadiazolyl (e.g. 1,2,3-thiadiazolyl, 1,2,4-thiadiazolyl, 1,3,4-thiadiazolyl, 1,2,5-thiadiazolyl, etc.); saturated 3 to 8 membered rings containing 1 to 2 sulfur atoms and 1 to 3 nitrogen atoms such as, but not limited to, thiazolodinyl; saturated and unsaturated 3 to 8 membered rings containing 1 to 2 sulfur atoms such as, but not limited to, thienyl, dihydrodithiinyl, dihydrodithionyl, tetrahydrothiophene, tetrahydrothiopyran; unsaturated condensed heterocyclic rings containing 1 to 2 sulfur atoms and 1 to 3 nitrogen atoms such as, but not limited to, benzothiazolyl, benzothiadiazolyl, benzothiazinyl (e.g. 2H-1,4-benzothiazinyl, etc.), dihydrobenzothiazinyl (e.g. 2H-3,4-dihydrobenzothiazinyl, etc.), unsaturated 3 to 8 membered rings containing oxygen atoms such as, but not limited to furyl; unsaturated condensed heterocyclic rings containing 1 to 2 oxygen atoms such as benzodioxolyl (e.g., 1,3-benzodioxoyl, etc.); unsaturated 3 to 8 membered rings containing an oxygen atom and 1 to 2 sulfur atoms such as, but not limited to, dihydrooxathiinyl; saturated 3 to 8 membered rings containing 1 to 2 oxygen atoms and 1 to 2 sulfur atoms such as 1,4-oxathiane; unsaturated condensed rings containing 1 to 2 sulfur atoms such as benzothienyl, benzodithiinyl; and unsaturated condensed heterocyclic rings containing an oxygen atom and 1 to 2 oxygen atoms such as benzoxathiinyl. Heterocyclyl group also include those described above in which one or more S atoms in the ring is double-bonded to one or two oxygen atoms (sulfoxides and sulfones). For example, heterocyclyl groups include tetrahydrothiophene oxide and tetrahydrothiophene 1,1-dioxide. Typical heterocyclyl groups contain 5 or 6 ring members. Thus, for example, heterocyclyl groups include morpholinyl, piperazinyl, piperidinyl, pyrrolidinyl, imidazolyl, pyrazolyl, 1,2,3-triazolyl, 1,2,4-triazolyl, tetrazolyl, thiophenyl, thiomorpholinyl, thiomorpholinyl in which the S atom of the thiomorpholinyl is bonded to one or more O atoms, pyrrolyl, pyridinyl homopiperazinyl, oxazolidin-2-onyl, pyrrolidin-2-onyl, oxazolyl, quinuclidinyl, thiazolyl, isoxazolyl, furanyl, and tetrahydrofuranyl.

The phrase "substituted heterocyclyl" refers to an unsubstituted heterocyclyl group as defined above in which one or more of the ring members is bonded to a non-hydrogen atom such as described above with respect to substituted alkyl groups and substituted aryl groups. Examples include, but are not limited to, 2-methylbenzimidazolyl, 5-methylbenzimidazolyl, 5-chlorobenzthiazolyl, 1-methyl piperazinyl, 2-phenoxy-thiophene, and 2-chloropyridinyl among others. In addition, substituted heterocyclyl groups also include heterocyclyl groups in which the bond to the non-hydrogen atom is a bond to a carbon atom that is part of a substituted and unsubstituted aryl, substituted and unsubstituted arylalkyl, or unsubstituted heterocyclyl group. Examples include but are not limited to 1-benzylpiperidinyl, 3-phenylhiomorpholinyl, 3-(pyrrolidin-1-yl)-pyrrolidinyl, and 4-(piperidin-1-yl)-piperidinyl.

The phrase "unsubstituted heterocyclylalkyl" refers to unsubstituted alkyl groups as defined above in which a hydrogen or carbon bond of the unsubstituted alkyl group is replaced with a bond to a heterocyclyl group as defined above. For example, methyl (—$CH_3$) is an unsubstituted alkyl group. If a hydrogen atom of the methyl group is replaced by a bond to a heterocyclyl group, such as if the carbon of the methyl were bonded to carbon 2 of pyridine (one of the carbons bonded to the N of the pyridine) or carbons 3 or 4 of the pyridine, then the compound is an unsubstituted heterocyclylalkyl group.

The phrase "substituted heterocyclylalkyl" has the same meaning with respect to unsubstituted heterocyclylalkyl groups that substituted aralkyl groups had with respect to unsubstituted aralkyl groups. However, a substituted heterocyclylalkyl group also includes groups in which a non-hydrogen atom is bonded to a heteroatom in the heterocyclyl group of the heterocyclylalkyl group such as, but not limited to, a nitrogen atom in the piperidine ring of a piperidinylalkyl group. In addition, a substituted heterocyclylalkyl group also includes groups in which a carbon bond or a hydrogen bond of the alkyl part of the group is replaced by a bond to a substituted and unsubstituted aryl or substituted and unsubstituted arylalkyl group. Examples include but are not limited to phenyl-(piperidin-1-yl)-methyl and phenyl-(morpholin-4-yl)-methyl.

The invention provides improved non-aqueous electrolyte solutions for electrochemical devices such as Li-ion cells through the use of stabilization additives. In particular it has been found that the use of substituted or unsubstituted organoamines (including unsaturated organoamines), alkanes, alkenes, or aryl compounds in the electrolytes of Li-ion batteries significantly improve their cycle performance. Unexpectedly, when substituted or unsubstituted organoamines, alkanes, alkenes, or aryl compounds are blended with a metal bis(chelato)borate, a synergistic effect occurs; the resulting electrochemical Li-ion cells display excellent calendar and cycle life across a wide temperature range and possess high specific energy and power.

Suitable stabilization additives that, when appropriately blended, enhance calendar and cycle life in the lithium based cells include the following materials: substituted or unsubstituted organoamines, substituted or unsubstituted alkanes, substituted or unsubstituted alkenes, substituted or unsubstituted aryl compounds and metal bis(chelato)borates. Particularly suitable are pyridazine, vinyl pyridazine, quinoline, vinyl quinoline, pyridine, vinyl pyridine, indole, vinyl indole, triethanol amine, 1,3-dimethyl butadiene (DMB), butadiene, biphenyl, vinyl biphenyl, o-terphenyl, 1,2 diphenyl ether, N-methylpyrrole, 1,2-diphenylethane, vinyl ethylene carbonate(VEC), vinyl carbonate, imidazole, vinyl imidazole, piperidine, vinyl piperidine, pyrimidine, vinyl pyrimidine, pyrazine, vinyl pyrazine, pyrimidine, vinyl pyrimidine, isoquinoline, vinyl isoquinoline, quinoxaline, vinyl quinoxaline and lithium (chelato)borates such as LiBOB and $Li(C_2O_4)BF_2$.

In the non-aqueous electrolytes of the present invention, the first additive and second additives are present independently in an amount from about 0.0005 to about 30 wt %. In some embodiments, the first additive is present in an amount of about 0.001, 0.005, 0.01, 0.05 to about 25, 20, 15, 10 or 5 wt %, and more typically, from about 0.01 or 0.1 to about 2, 3 or 4 wt %. When the first additive is a substituted or unsubstituted unsaturated organoamine, it is typically present in about 0.001 or 0.01 wt % to 2, 3 or 4 wt %. In some embodiments, the second additive is present in an amount of about 0.0005, 0.001, or 0.01 wt % to about 0.1, 0.5, 1, 2, 3, 4, 5 or 10 wt %. Where the metal (chelato)borate is present as the only stabilization additive, it may be present in an amount of about 0.0005 to 30 wt % and other ranges as described herein.

Cathode materials contemplated for use in the present invention include lithium manganese oxide spinel, lithium cobalt oxide, lithium nickel oxide, their stoichiometric compounds and composite metal oxide including at least one transition metal compound as well transition metal based phosphates. Suitable anodes for use in electrochemical devices of this invention include graphitic materials including natural graphite, artificial graphite, graphitized meso-carbon microbeads, and graphite fibers, as well as any amorphous carbon materials.

The porous separator may be made from materials well known to those skilled in the art. Typically, the porous separator comprises polypropylene, polyethylene, or a multilayer laminate of polypropylene and polyethylene.

Electrolyte polar aprotic solvents contemplated by the present invention include ethylene carbonate, diethyl carbonate, propylene carbonate, dimethyl carbonate, methylethyl carbonate, γ-butyrolactone, methyl propionate, butyl propionate, ethyl propionate, sulfolane, 1,2-dimethoxyethane, 1,2-diethoxyethane, tetrahydrofuran, 1,3-dioxolane, and 4-methyl-1,3-dioxolane. The cell electrolyte solvent is usually a blend of two or more of such solvents. Alkali metal salts that may be used in non-aqueous electrolytes of the present invention include $LiClO_4$, $LiPF_6$, $LiAsF_6$, $LiSbF_6$, $LiBF_6$, $LiB(C_6H_5)_4$, $LiSO_3CF_3$, $LiN(SO_2CF_3)_2$, $LiN(SO_2CF_2CF_3)$ and LiBOB, or may be blend of two or more of the lithium salts. Thus, this invention provides electrochemical lithium-metal primary and secondary cells with excellent calendar life across a broad temperature range, and includes cells with liquid, solid and plasticized polymer electrolytes.

While not wishing to be bound by any theory, it is believed that electrochemical devices of the present invention exhibit enhanced performance due to the chemical additives present in the non-aqueous electrolytes. Thus it is believed that the chemical additives protect the electrodes from chemical attack, thereby lessening or preventing subsequent performance degradation. For example, the substituted or unsubstituted organoamines, alkanes, alkenes, and aryl compounds are believed to form a protective film on the anode. This film prevents $Mn^{2+}$ from catalyzing degradation of the carbon anode. At the same time, the film is also a good conductor of lithium ions. Organoamines of the present invention may also function to inhibit cathode degradation by neutralizing any HF that may be present in the electrolyte, and/or the organoamines may complex the manganese ions. By comparison, metal (chelato)borates such as LiBOB and the fluorinated analog thereof have the ability to passivate the surfaces of both the anode and cathode, thereby enhancing the capacity retention of both of the electrodes. The passivation film due to, e.g., LiBoB or $LiC_2O_4BF_2$, when combined with the passivation film due to the first additive, e.g., vinyl-pyridine, provide strong protection against the surface reaction that may otherwise lead to an increase in interfacial resistance and fading of both the capacity and the power of the cell.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All references cited herein are specifically incorporated by reference into the disclosure of this application.

EXAMPLES

Example 1

Figure 2:
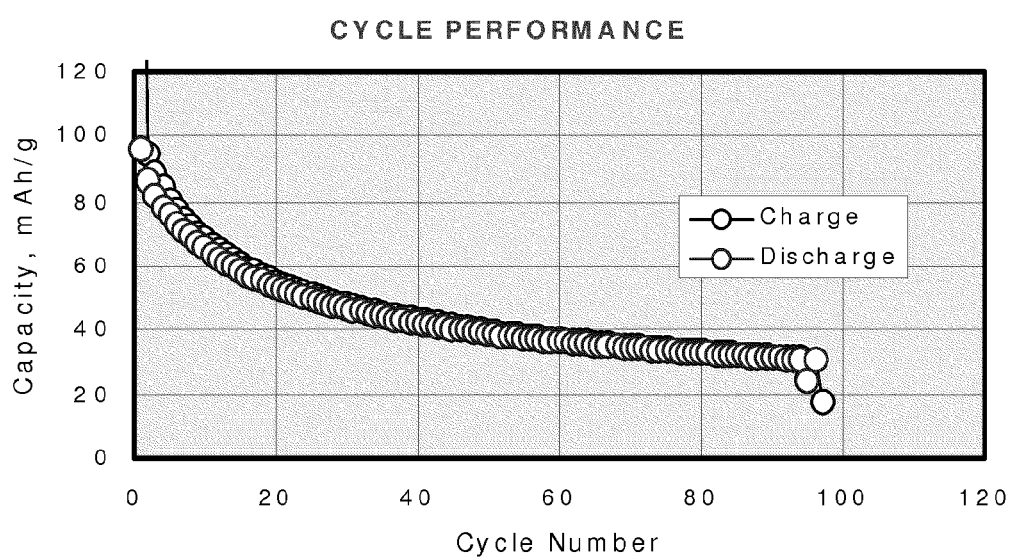
FIG. 2 is a schematic illustrative of the specific capacity retention of $LiMn_2O_4$ spinel cathode versus meso-carbon microbead anode in 1M $LiPF_6$ in ethylene carbonate (EC)/diethyl carbonate (DEC) electrolyte at 55° C. It shows a drastic capacity decrease over cycle number.

The specific examples referred to here utilize an electrochemical cell, such as that depicted in FIG. 1. Referring to FIG. 1, there is disclosed an electrochemical cell 10 having an anode 12 separated by an electrolyte 14 and a cathode 16, all contained in an insulating housing 18 with the anode separated from the cathode by the electrolyte and suitable terminals (not shown) being provided in electrical contact respectively with the anode 12 and the cathode 16. Binders associated with the respective electrodes are well known in the art and will not be described here. In this particular example, the electrochemical cell comprises a graphite anode such as natural graphite, artificial graphite meso-carbon microbead, carbon fiber or hard carbon, a manganese spinel cathode, and an electrolyte of approximately 1 M $LiPF_6$ in 1:1 mixture of EC/DEC. FIG. 2 depicts the resulting capacity retention when the cell was cycled between 3.0 and 4.2 V.

Example 2

Figure 3:
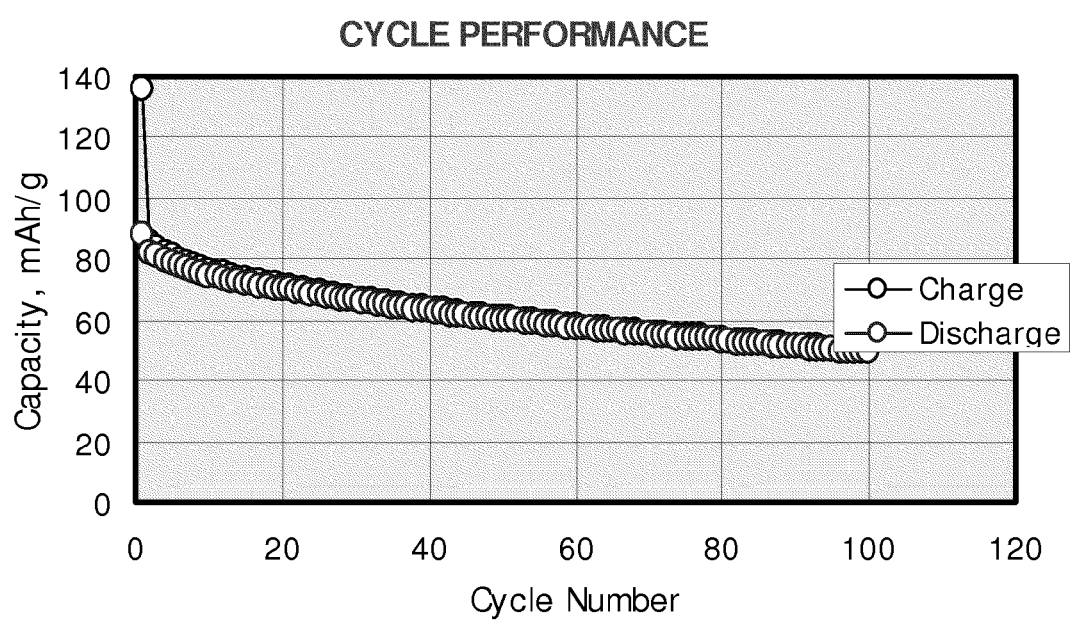
FIG. 3 is a schematic illustrative of the specific capacity retention of $LiMn_2O_4$ cathode versus meso-carbon microbead anode in 1M $LiPF_6$ EC/DEC electrolyte with 1 wt % 4-vinyl pyridine as an additive, at 55° C. This system shows much improved capacity retention compared to the cell system without the additive shown in FIG. 2.

4-Vinyl pyridine was added to the electrolyte of the electrochemical cell of Example 1 to give a concentration of 1 wt %. The results of cycling the cell between 3.0 and 4.2 V is shown in FIG. 3. A protective film has likely formed on the surface of the carbon anode. This cell demonstrated improved capacity retention over the electrochemical cell of Example 1 (compare FIGS. 2 and 3).

Example 3

Figure 4:
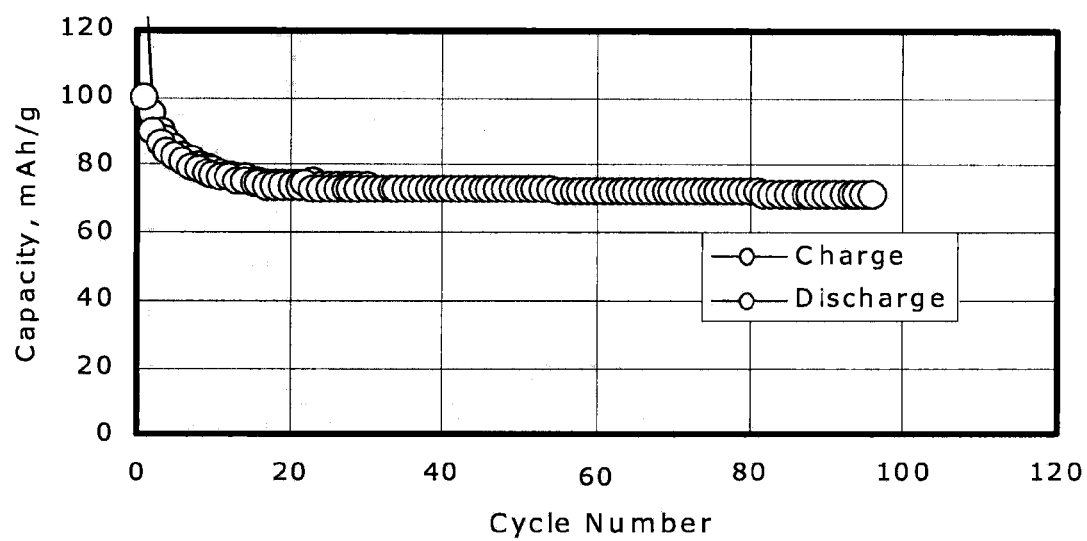
FIG. 4 is a schematic illustrative of the specific capacity retention of $LiMn_2O_4$ cathode versus meso-carbon microbead anode in 1M $LiPF_6$ EC/DEC electrolyte with 1 wt % 4-vinyl pyridine and 0.005 wt % LiBOB salt as additives, at 55° C. The cell shows even better capacity retention than the cell system with the single additive of 1 wt % 4-vinyl pyridine as shown in FIG. 3.

4-Vinyl pyridine (1 wt %) and lithium bisoxalatoborate (0.005 wt %) (both commercially available) were added to the electrolyte of the electrochemical cell of Example 1. The results of cycling the cell between 3.0 and 4.2 V are shown in FIG. 4. This cell system demonstrated an improved capacity retention over the electrochemical cells of Examples 1 and 2, as can be seen by comparing FIGS. 2-4. It is believed that the improvement results from the stabilizing effect of LiBOB on the electrolyte and the formation of a protective film on the surface of the carbon anode.

While certain embodiments have been illustrated and described, it should be understood that changes and modifications can be made therein in accordance with one of ordinary skill in the art without departing from the invention in its broader aspects. Various features of the invention are defined in the following claims.

We claim:
1. A non-aqueous electrolyte comprising:
an alkali metal salt that is $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, or a mixture of any two or more thereof;
a polar aprotic solvent;
a first additive that is a substituted or unsubstituted organoamine selected from the group consisting of pyridazine, vinyl pyridazine, quinoline, vinyl quinoline, pyridine, vinyl pyridine, indole, vinyl indole, triethanolamine, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, N-methylpyrrole, and a mixture of any two or more thereof; and
$Li(C_2O_4)BF_2$.

2. The non-aqueous electrolyte of claim 1, wherein the first additive is N-methyl pyrrole, 2-vinyl pyridine, 4-vinyl pyridine, or triethanolamine.

3. The non-aqueous electrolyte of claim 1, wherein the polar aprotic solvent is ethylene carbonate, propylene carbonate, dimethyl carbonate, diethyl carbonate, ethyl methyl carbonate, dimethyl ether, gamma butyrolactone, or a mixture of any two or more thereof.

4. A non-aqueous electrolyte comprising:
an alkali metal salt;
a polar aprotic solvent; and
a first additive that is a substituted or unsubstituted unsaturated organoamine;
a second additive that is $Li(C_2O_4)BF_2$.

5. The non-aqueous electrolyte of claim 4, wherein the first additive is vinyl pyridazine, vinyl quinoline, vinyl pyridine, vinyl indole, vinyl imidazole, vinyl piperidine, vinyl pyrimidine, vinyl pyrazine, vinyl isoquinoline, vinyl quinoxaline, or a mixture of any two or more thereof.

6. The non-aqueous electrolyte of claim 4, wherein the first additive is vinyl pyridine.

7. The non-aqueous electrolyte of claim 6, wherein the first additive is 2- or 4-vinyl pyridine.

8. The non-aqueous electrolyte of claim 4, wherein the alkali metal salt is a lithium salt.

9. The non-aqueous electrolyte of claim 4, wherein the alkali metal salt is $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, or a mixture of any two or more thereof.

10. An electrochemical device comprising:
a cathode;
an anode; and
an electrolyte comprising
an alkali metal salt;
a polar aprotic solvent;
a first additive that is a substituted or unsubstituted organoamine selected from the group consisting of pyridazine, vinyl pyridazine, quinoline, vinyl quinoline, pyridine, vinyl pyridine, indole, vinyl indole, triethanolamine, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, N-methylpyrrole, and a mixture of any two or more thereof; and
a second additive that is $Li(C_2O_4)BF_2$.

11. The electrochemical device of claim 10, wherein the device is a lithium secondary battery; the cathode is a lithium metal oxide cathode; the anode is a carbon or lithium metal anode; and the anode and cathode are separated from each other by a porous separator.

12. The electrochemical device of claim 11, wherein the first additive is present in an amount from about 0.001 to about 10 wt %.

13. The electrochemical device of claim 11, wherein the first additive is present in an amount of about 0.01 to 2 wt %.

14. The electrochemical device of claim 11, wherein the second additive is present in an amount of about 0.001 to about 2 wt %.

15. The electrochemical device of claim 11, wherein the polar aprotic solvent is ethylene carbonate, propylene carbonate, dimethyl carbonate, diethyl carbonate, ethyl methyl carbonate, dimethyl ether, gamma butyrolactone, or a mixture of any two or more thereof.

16. The electrochemical device of claim 11, wherein the alkali metal salt is $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, or a mixture of any two or more thereof.

* * * * *